(12) United States Patent
Hata et al.

(10) Patent No.: US 11,106,269 B2
(45) Date of Patent: Aug. 31, 2021

(54) INFORMATION PROCESSING APPARATUS

(71) Applicant: DENSO TEN Limited, Kobe (JP)

(72) Inventors: Motofumi Hata, Kobe (JP); Masatoshi Watanabe, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 160 days.

(21) Appl. No.: 16/548,913

(22) Filed: Aug. 23, 2019

(65) Prior Publication Data

US 2020/0174545 A1  Jun. 4, 2020

(30) Foreign Application Priority Data

Nov. 30, 2018 (JP) .............................. JP2018-224452

(51) Int. Cl.
  *G06F 1/3234* (2019.01)
  *B60R 16/023* (2006.01)
(52) U.S. Cl.
  CPC .......... *G06F 1/3243* (2013.01); *B60R 16/023* (2013.01)
(58) Field of Classification Search
  CPC ............................ G06F 1/3243; B60R 16/023
  See application file for complete search history.

(56) References Cited

U.S. PATENT DOCUMENTS

| | | | | |
|---|---|---|---|---|
| 6,304,981 | B1* | 10/2001 | Spears | G06F 11/004 714/22 |
| 8,245,062 | B1* | 8/2012 | Nanda | G06F 1/3293 713/320 |
| 2004/0073817 | A1* | 4/2004 | Liu | G06F 1/30 713/300 |
| 2006/0136154 | A1* | 6/2006 | Bliley | G06F 1/28 702/58 |
| 2009/0164821 | A1* | 6/2009 | Drescher | H04W 52/0283 713/323 |
| 2016/0246360 | A1* | 8/2016 | Eckert | G06F 9/4893 |

FOREIGN PATENT DOCUMENTS

JP    2011-203967 A    10/2011

* cited by examiner

*Primary Examiner* — Nimesh G Patel
(74) *Attorney, Agent, or Firm* — Oliff PLC

(57) ABSTRACT

An information processing apparatus which operates in an operation mode as either of a first mode and a second mode in which power consumption is lower than power consumption in the first mode, includes: a normal control unit; a delay filter configured to delay a mode signal by a delay time longer than a time required for a preparation processing by the normal control unit; a power saving shift unit configured to stop the normal control unit after termination of the preparation processing in a case where the mode signal indicates shifting to the second mod; and a return unit to release stop of the normal control unit in a case where at least one of the mode signal and the mode signal delayed indicates returning to the first mode.

6 Claims, 9 Drawing Sheets

INFORMATION PROCESSING APPARATUS

CROSS-REFERENCE TO RELATED APPLICATIONS

This application is based upon and claims the benefit of priority from prior Japanese patent application No. 2018-224452, filed on Nov. 30, 2018, the entire contents of which are incorporated herein by reference.

TECHNICAL FIELD

The present invention relates to an information processing apparatus which operates in a first mode or a second mode with power consumption lower than the first mode.

RELATED ART

An electronic control unit (ECU) mounted on a vehicle operates in a normal mode or a power saving mode with power consumption lower than the normal mode.

When an engine of the vehicle is stopped and a position of an ignition key of the vehicle is at an "ACCESSORY" position, the ECU operates in the power saving mode. When the position of the ignition key of the vehicle is located at an "ON" position, a wake-up signal is input to the ECU. The ECU returns from the power saving mode to the normal mode based on the input wake-up signal.

JP-A-2011-203967 discloses an electronic control apparatus including a first control microcomputer and a second control microcomputer. A filter circuit of the first control microcomputer and a filter circuit of the second control microcomputer operate at different sampling periods. Only when both the filter circuit of the first control microcomputer and the filter circuit of the second control microcomputer continuously detect a signal of a predominant level twice, the first control microcomputer and the second control microcomputer determine input of the wakeup signal and return to the normal mode.

SUMMARY

The ECU executes preparation processing for shifting to the power saving mode before shifting from the normal mode to the power saving mode. The preparation processing includes, for example, a termination processing of a program which is not executed in the power saving mode. There is an ECU which cannot detect the wake-up signal during the execution of the preparation processing.

For example, it is assumed that a driver of the vehicle changes the position of the ignition key from the "ON" position to the "ACCESSORY" position, and then immediately returns the position of the ignition key to the "ON" position. In this case, the wake-up signal is input to the ECU which is executing the preparation processing. The ECU executes the preparation processing, and thus the ECU cannot detect the wake-up signal. As a result of the wake-up signal, the ECU cannot return to the normal mode. However, a problem that the electronic control apparatus according to Patent Literature 1 cannot return to the normal mode is not assumed.

In view of the above problems, an object of the present invention is to provide an information processing apparatus capable of returning from a power saving mode to a normal mode rapidly.

According to a first aspect of the present invention, there is provided an information processing apparatus, which operates in an operation mode as either of a first mode and a second mode in which power consumption is lower than power consumption in the first mode, the information processing apparatus including: a normal control unit configured to execute a predetermined processing when the operation mode is the first mode, and to stop when the operation mode is the second mode, the normal control unit being further configured to execute a preparation processing in a case where the operation mode of the information processing apparatus is shifted to the second mode; a delay filter configured to delay a mode signal indicating the operation mode by a delay time, the delay time being longer than a time required for the preparation processing; a power saving shift unit configured to cause the normal control unit to execute the preparation processing in a case where the mode signal indicates shifting to the second mode, to interrupt reception of a new mode signal and a new mode signal delayed by the delay filter while the normal control unit executes the preparation processing, and to stop the normal control unit after termination of the preparation processing; and a return unit configured to release stop of the normal control unit in a case where, after the normal control unit terminates the preparation processing, at least one of the mode signal and the mode signal delayed by the delay filter indicates returning to the first mode.

According to the first aspect, receptions of a mode signal and a delayed mode signal are prohibited during preparation processing. The delay time of the delay filter is longer than the time required for the preparation processing. Even when a new mode signal instructs return to the normal mode during the preparation processing, the return unit may release the stop of the normal control unit based on a delayed new mode signal. Therefore, the information processing apparatus according to the first aspect may return from the second mode, that is, the power saving modem, to the first mode, that is the normal mode, rapidly.

According to a second aspect of the present invention, there is provided the information processing apparatus according to the first aspect, further including an additional filter configured to delay the mode signal by an additional delay time shorter than the delay time of the delay filter, wherein difference between the additional delay time and the delay time is longer than the time required for the preparation processing, wherein, in a case where a mode signal delayed by the additional filter indicates the shifting to the second mode, the power saving shift unit causes the normal control unit to execute the preparation processing, interrupts reception of a new mode signal delayed by the additional filter and a new mode signal delayed by the delay filter while the normal control unit executes the preparation processing, and stops the normal control unit after the termination of the preparation processing, and wherein the return unit releases the stop of the normal control unit in a case where at least one of the mode signal delayed by the additional filter and the mode signal delayed by the delay filter indicates the returning to the first mode.

According to the second aspect, a difference between the additional delay time of the additional filter and the delay time of the delay filter is longer than time of the preparation processing. Therefore, even when a new mode signal delayed by the additional filter instructs the return to the normal mode during execution of the preparation processing, the information processing apparatus may return to the normal mode based on the new mode signal delayed by the delay filter. Therefore, information processing apparatus according to the second aspect may return from the power saving mode to the normal mode rapidly.

According to a third aspect of the present invention, there is provided the information processing apparatus according to the second aspect, wherein, in response to receiving the mode signal indicating the shifting to the second mode from the additional filter, the power saving shift unit starts arbitration processing for notifying another apparatus of the shifting to the second mode before the preparation processing regardless of whether the mode signal indicating the shifting to the second mode is received from the delay filter.

According to the third aspect, the arbitration processing may be started rapidly, so that the period from occurrence of a predetermined level change in the mode signal to shift to the power saving mode may be shortened. As a result, power consumption of the information processing apparatus may be reduced.

According to a fourth aspect of the present invention, there is provided the information processing apparatus according to the third aspect, wherein the power saving shift unit causes the normal control unit to start the preparation processing in response to the mode signal indicating the shifting to the second mode from the delay filter when the arbitration processing is terminated.

According to the fourth aspect, the information processing apparatus may be prevented from erroneously shifting to the power saving mode when one of the mode signal and the delayed mode signal instructs the shift to the power saving mode due to the influence of noises or the like.

According to a fifth aspect of the present invention, there is provided the information processing apparatus according to the third or fourth aspect, further including a first detection unit configured to detect the mode signal delayed by the additional filter; and a second detection unit configured to detect the mode signal delayed by the delay filter.

According to the fifth aspect, the difference between the time when a predetermined level change occurs in the mode signal delayed by the additional filter and the time when a predetermined level change occurs in the mode signal delayed by the delay filter may be acquired with high accuracy. As a result, when a predetermined level change occurs accidentally in either of the two delayed mode signals, the information processing apparatus may be prevented from erroneously shifting to the power saving mode.

According to the sixth aspect, there is provided a method of controlling an information processing apparatus including a normal control unit which is configured to execute a predetermined processing when an operation mode is a first mode, and to stop when the operation mode is a second mode in which power consumption is lower than power consumption in the first mode, the method including: delaying a mode signal indicating the operation mode by a delay time, the delay time being longer than a time required for a preparation processing executed by the normal control unit in a case where the operation mode is shifted to the second mode; causing the normal control unit to execute the preparation processing in a case where the mode signal indicates shifting to the second mode, interrupting reception of a new mode signal and a new mode signal delayed by the delay filter while the normal control unit executes the preparation processing, stopping the normal control unit after termination of the preparation processing; and releasing stop of the normal control unit in a case where, after the normal control unit terminates the preparation processing, at least one of the mode signal and the mode signal delayed by the delay filter indicates returning to the first mode.

The sixth aspect may be used in the first aspect.

The present invention provides an information processing apparatus capable of returning from the power saving mode to the normal mode rapidly.

DETAILED DESCRIPTION

Figure 1:
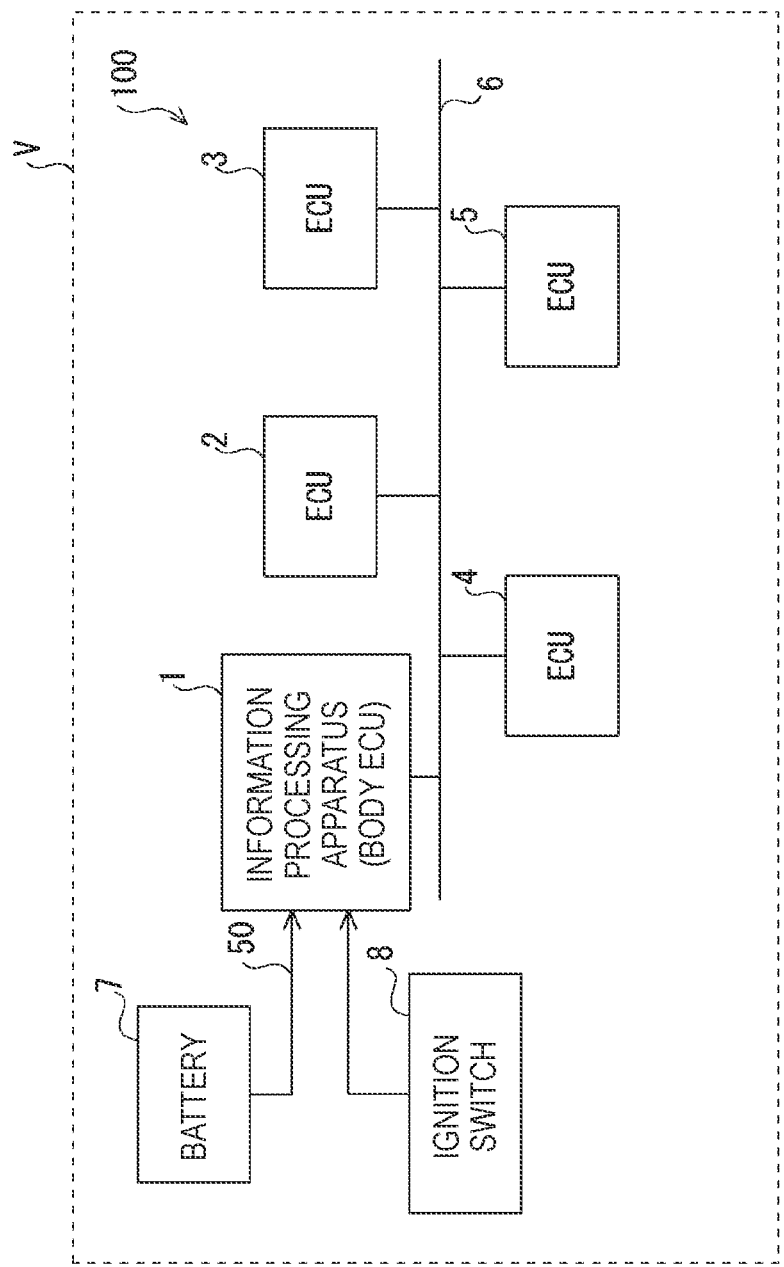
FIG. 1 is a function block diagram showing a configuration of an in-vehicle network system including an information processing apparatus according to an embodiment of the present invention.

Hereinafter, exemplary embodiments of the present invention will be described in detail with reference to the drawings. In the drawings, the same or corresponding parts are denoted by the same reference numerals, and the description thereof will not be repeated.

{1. Configuration}
{1.1.1 Configuration of In-Vehicle Network System 100}

FIG. 1 is a function block diagram showing a configuration of an in-vehicle network system 100 including an information processing apparatus 1 according to an embodiment of the present invention. The in-vehicle network system 100 is mounted on a vehicle V such as an automobile, and includes the information processing device 1, Electric Control Units (ECUs) 2 to 5, a bus 6, a battery 7, and an ignition switch 8.

The information processing apparatus 1 is a body ECU in the present embodiment. The information processing apparatus 1 controls a door lock, an indoor lamp, a headlight, a meter, and the like of the vehicle V by electric power supplied from the battery 7 mounted on the vehicle V. The information processing apparatus 1 operates in an operation mode, which is either of a normal mode and a power saving mode, based on an ignition signal 50 received from the ignition switch 8.

In the following descriptions, an example in which the information processing apparatus 1 controls a door lock and a meter will be described, and descriptions of control of other functions will be omitted. In the following descriptions, the ignition signal is described as an "IG signal".

The normal mode is an operation mode of the information processing apparatus 1 when the ignition switch 8 is on. The information processing apparatus 1 controls all the control objects of the information processing apparatus 1 in the normal mode. In the present embodiment, all the control objects are the door lock and the meter.

The power saving mode is an operation mode of the information processing apparatus 1 when the ignition switch 8 is off. Power consumption in the power saving mode is lower than power consumption in the normal mode. The information processing apparatus 1 controls a part of all the control objects of the information processing apparatus 1 in the normal mode.

Each of ECUs 2 to 4 is, for example, an engine ECU, a power steering ECU, an airbag ECU, or the like. Although not shown in FIG. 1, each of the ECUs 2 to 5 receives supply of electric power from the battery 7. Each of the ECUs 2 to 5 may receive the IG signal 50 from the ignition switch 8.

The information processing apparatus 1 and the ECUs 2 to 5 are connected with each other via the bus 6 and communicate with each other using a Controller Area Network (CAN) protocol.

{1.2. Configuration of Information Processing Apparatus 1}

Figure 2:
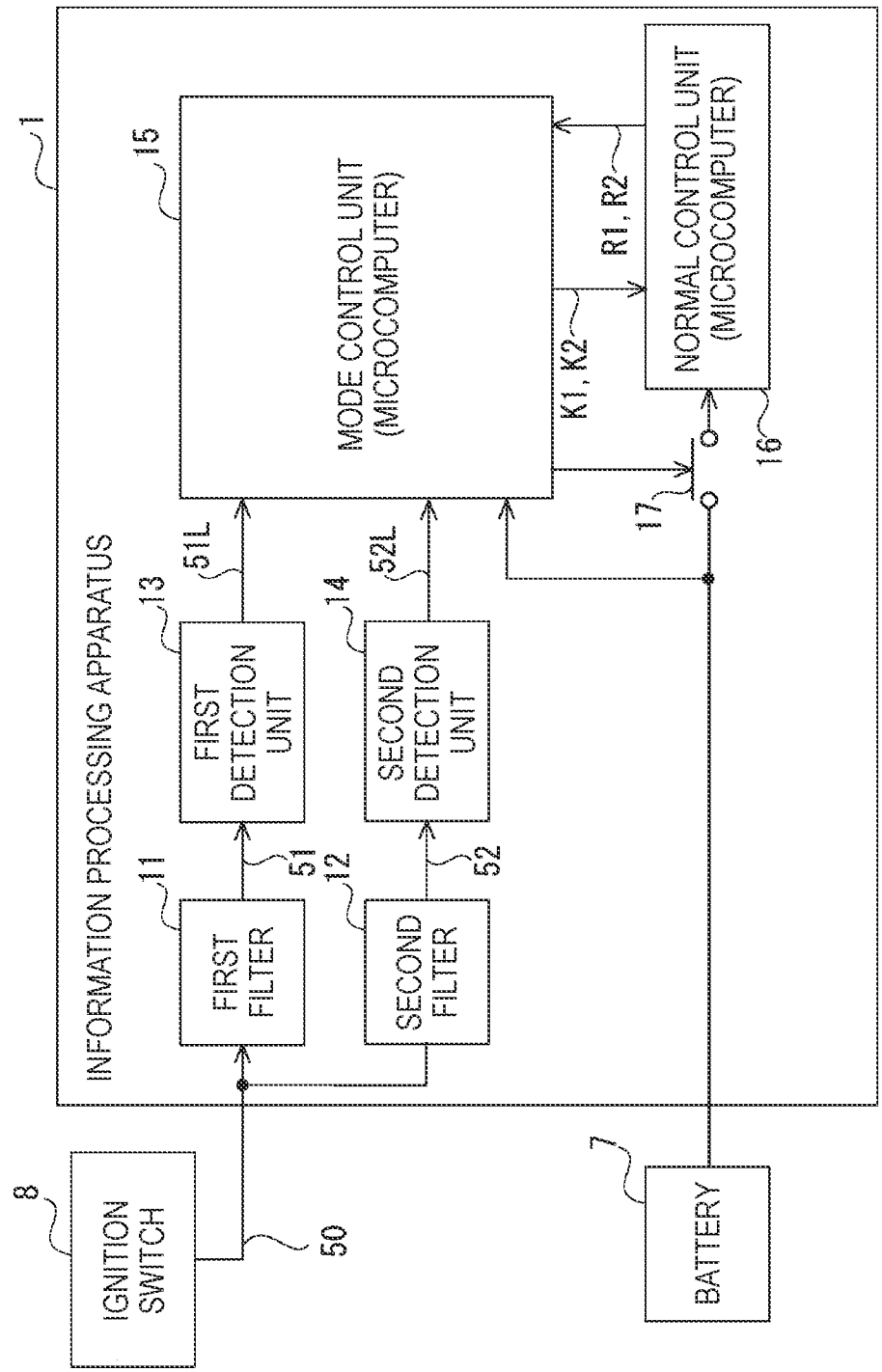
FIG. 2 is a function block diagram showing a configuration of the information processing apparatus shown in FIG. 1.

FIG. 2 is a function block diagram showing a configuration of the information processing apparatus 1 shown in FIG. 1. Referring to FIG. 2, the information processing apparatus 1 receives the IG signal 50 from the ignition switch 8, and operates in the normal mode or the power saving mode based on the received IG signal 50.

The information processing apparatus 1 includes a first filter 11, a second filter 12, a first detection unit 13, a second detection unit 14, a mode control unit 15, a normal control unit 16, and a switch 17.

The first filter 11 is a low-pass filter formed by a passive element, and releases chattering contained in a mode signal. The first filter 11 corresponds to an additional filter of the present invention. The first filter 11 receives the IG signal 50 from the ignition switch 8 and delays the received IG signal 50 by first predetermined time. The first filter 11 outputs the IG signal 50 delayed by the first predetermined time to the first detection unit 13 as the delayed IG signal 51.

The second filter 12 is a low-pass filter formed by a passive element, and releases chattering contained in a mode signal. The second filter 12 corresponds to a delay filter of the present invention. The second filter 12 receives the IG signal 50 from the ignition switch 8 and delays the received IG signal 50 by second predetermined time. The second filter 12 outputs the IG signal 50 delayed by the second predetermined time to the second detection unit 14 as the delayed IG signal 52. The second predetermined time is longer than the first predetermined time. A delay time difference, which is a difference between the first predetermined time and the second predetermined time, is longer than time required for preparation processing executed when the information processing apparatus 1 is shifted to the power saving mode. Details of the delay time difference and the preparation processing will be described below.

The first detection unit 13 receives the delayed IG signal 51 from the first filter 11, and detects a level change of the delayed IG signal 51 received. The first detection unit 13 outputs a detection signal 51L, which indicates that the level change of the delayed IG signal 51 is detected, to the mode control unit 15.

The second detection unit 14 receives the delayed IG signal 52 from the second filter 12, and detects a level change of the delayed IG signal 52 received. The second detection unit 14 outputs a detection signal 52L, which indicates that the level change of the delayed IG signal 52 is detected, to the mode control unit 15.

The mode control unit 15 is a microcomputer. The mode control unit 15 receives the detection signal 51L from the first detection unit 13 and receives the detection signal 52L from the second detection unit 14. The mode control unit 15 causes the information processing apparatus 1 to operate in either the normal mode or the power saving mode based on the detection signals 51L and 52L received. In addition, the mode control unit 15 performs the door lock control by the electric power supplied from the battery 7 in both the normal mode and the power saving mode.

The normal control unit 16 is a microcomputer different from the microcomputer constituting the mode control unit 15. When the information processing apparatus 1 operates in the normal mode, the normal control unit 16 receives supply of electric power from the battery 7 and controls the meter of the vehicle V. When the information processing apparatus 1 operates in the power saving mode, the normal control unit 16 does not receive the supply of electric power from the battery 7, and thus the operation thereof is stopped.

The switch 17 switches a connection between the battery 7 and the normal control unit 16 on/off based on a control signal S from the mode control unit 15. One end of the switch 17 is connected to the battery 7, and the other end of the switch 17 is connected to the normal control unit 16. When the switch 17 is on, the battery 7 supplies power to the normal control unit 16. When the switch 17 is off, the supply of electric power to the normal control unit 16 is stopped.

{1.3. Configuration of Mode Control Unit 15}

Figure 3:
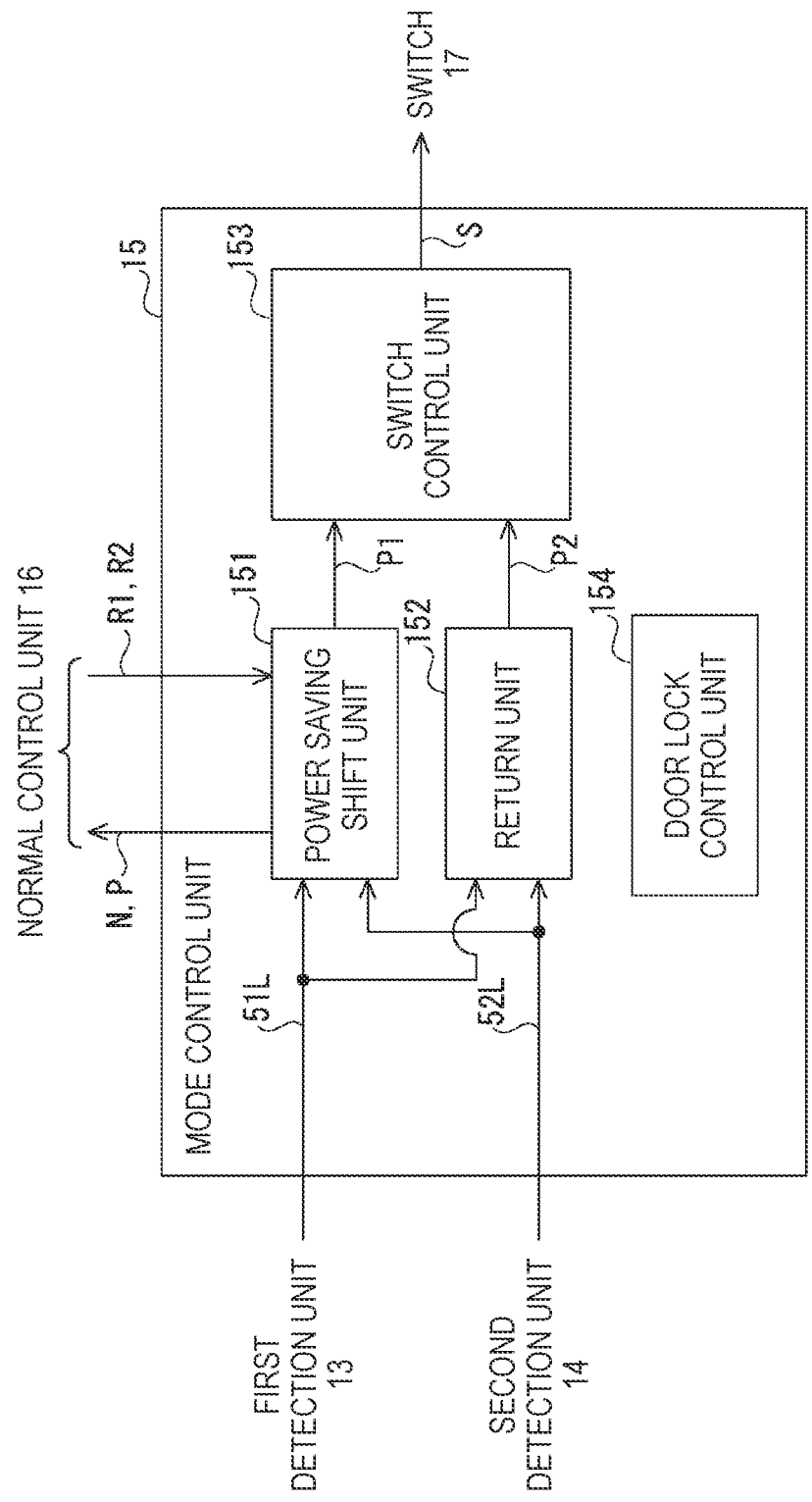
FIG. 3 is a function block diagram showing a configuration of a mode control unit shown in FIG. 2.

FIG. 3 is a function block diagram showing a configuration of the mode control unit 15 shown in FIG. 2. Referring to FIG. 3, the mode control unit 15 includes a power saving shift unit 151, a return unit 152, a switch control unit 153, and a door lock control unit 154. In FIG. 3, the display of the power supply from the battery 7 is omitted.

When falling in at least one of the delayed IG signals 51 and 52 is detected, the power saving shift unit 151 determines to cause the information processing apparatus 1 shift to the power saving mode. Specifically, the power saving shift unit 151 determines, based on the detection signal 51L received from the first detection unit 13 or the detection signal 52L received from the second detection unit 14, whether the falling in each of the delayed IG signals 51 and 52 is present.

When the power saving shift unit 151 determines to cause the information processing apparatus 1 to shift to the power saving mode, the power saving shift unit 151 outputs an arbitration instruction signal K1 instructing execution of arbitration processing and a preparation instruction signal K2 instructing execution of preparation processing to the normal control unit 16. After termination of the arbitration processing and the preparation processing, the power saving shift unit 151 outputs a switching instruction signal P1, which instructs to turn off the switch 17, to the switch control unit 153. Details of the arbitration processing and the preparation processing will be described below.

When rising in at least one of the delayed IG signals 51 and 52 is detected, the return unit 152 causes the information processing apparatus 1 to return from the power saving mode to the normal mode. Specifically, the return unit 152 determines, based on the detection signal 51L received from the first detection unit 13 or the detection signal 52L received from the second detection unit 14, whether the rising in the delayed IG signals 51 and 52 is present. When the return unit 152 determines the return to the normal mode, the return unit 152 outputs a switching instruction signal P2, which instructs to turn on the switch 17, to the switch control unit 153.

The falling in the IG signal means that a level of the IG signal changes from a high level to a low level within a preset time. The rising in the IG signal means that the level of the IG signal changes from a low level to a high level within preset time.

The switch control unit 153 turns off the switch 17 when receiving the switching instruction signal P1 from the power saving shift unit 151. The switch control unit 153 turns on the switch 17 when receiving the switching instruction signal P2 from the return unit 152.

The door lock control unit 154 controls locking and unlocking of doors of the vehicle V. The door lock control unit 154 controls a smart key system of the vehicle V. Therefore, the door lock control unit 154 is required to continue the operation even when the ignition switch is off.

{2. Operation}
{2.1. Delay of Filter}

Figure 4:
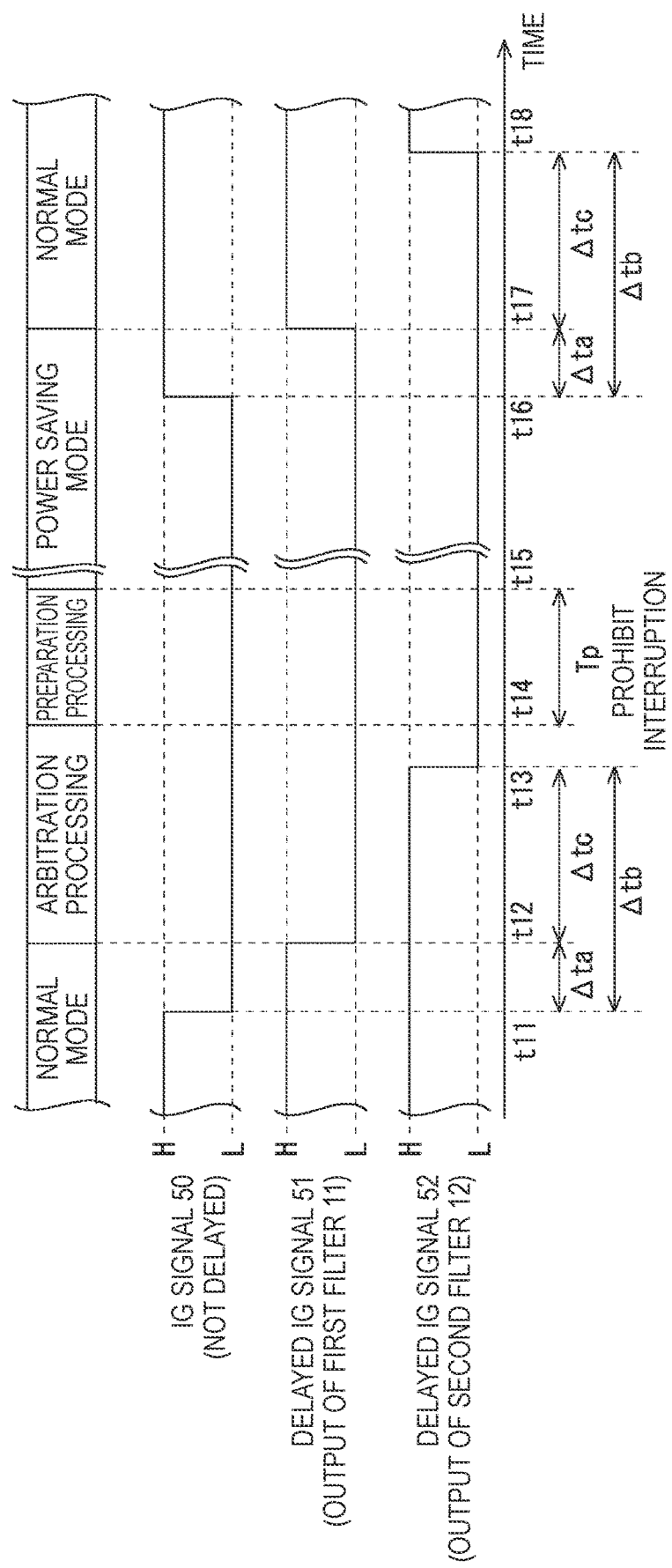
FIG. 4 is a time chart showing an example of operation when the information processing apparatus shown in FIG. 1 shifts to a power saving mode.

FIG. 4 is a time chart showing an example of a change in the operation mode of the information processing apparatus 1. Referring to FIG. 4, the level of the IG signal 50 changes from a high level to a low level at a time point t11. That is, the falling of the IG signal 50 occurs at the time point t11.

The IG signal 50 is input to the first filter 11 and the second filter 12. The first filter 11 delays the input IG signal 50 by time Δta. Therefore, the delayed IG signal 51 output from the first filter 11 changes from a high level to a low level at a time point t12 after the time Δta elapses from the time point t11.

The second filter 12 delays the input IG signal 50 by time Δtb. Therefore, the delayed IG signal 52 output from the second filter 12 changes from a high level to a low level at a time point t13 after the time Δtb elapses from the time point t11.

The length of time from the time point t12 to the time point t13 is represented by time Δtc. The time Δtc corresponds to a delay time difference. The delay time difference refers to a difference between delay time of the first filter 11 and delay time of the second filter 12. The delay time Δtc is longer than the time required for the information processing apparatus 1 to execute the preparation processing. The reason for this will be described below.

The first filter 11 and the second filter 12 may be used in which the time required for the preparation processing is measured in advance and the delay time difference is made longer than the measured time.

It is desirable that the delay time of the second filter 12 is variable. For example, the delay time of the second filter 12 can be dynamically changed by providing a variable coil capable of adjusting inductance or a variable capacitor capable of adjusting capacitance on the second filter 12. Alternatively, the delay time of the second filter 12 may be dynamically changed by dynamically changing the number of coils provided on the second filter 12 or dynamically changing the number of capacitors provided on the second filter 12.

As a result, by changing the number of programs executed by the normal control unit 16, the delay time difference can be easily adjusted even when the time required for the preparation processing is changed. The delay time of the first filter may be dynamically changed.

{2.2. Shift to Power Saving Mode}

When information processing apparatus 1 detects the falling of the delayed IG signal 51 during the operation in the normal mode, the information processing apparatus 1 shifts to the power saving mode.

Hereinafter, the operation of the information processing apparatus 1 when the falling of the IG signal 50 occurs at the time point t11 will be described. The operation mode of the information processing apparatus 1 during a period from the time point t11 to the time point t12 is the normal mode.

(Start of Arbitration Processing)

The first filter 11 outputs the delayed IG signal 51 to the first detection unit 13. The first detection unit 13 detects the falling of the delayed IG signal 51 at the time point t12 after the time Δta elapses from the time point t11. The first detection unit 13 outputs a detection signal 51L, which indicates that the falling of the delayed IG signal 51 is detected, to the power saving shift unit 151 and the return unit 152.

The power saving shift unit 151 receives the detection signal 51L from the first detection unit 13 at the time point t12, and determines occurrence of the falling of the delayed IG signal 51 based on the received detection signal 51L. The operation mode at the time point t12 is the normal mode and the falling of the delayed IG signal 51 occurs, so that the power saving shift unit 151 determines shift from the normal mode to the power saving mode at the time point t12.

The return unit 152 ignores the detection signal 51L received at the time point t12. This is because the operation mode is not the power saving mode at the time point t12.

The power saving shift unit 151 outputs the arbitration instruction signal K1 to the normal control unit 16, and instructs the normal control unit 16 to execute the arbitration processing. The normal control unit 16 starts the arbitration processing from the time point t12 based on the arbitration instruction signal K1 received from the power saving shift unit 151.

The normal control unit 16 executes the arbitration processing and transmits a shift notification, which notifies that the information processing apparatus 1 shifts to the power saving mode, to each of the ECUs 2 to 5. When receiving a shift notification response from each of the ECUs 2 to 5, the normal control unit 16 outputs the arbitration termination notification R1 to the power saving shift unit 151. In the example shown in FIG. 4, the normal control unit 16 outputs the arbitration termination notification R1 at a time point t14.

The second filter 12 outputs the delayed IG signal 52 to the second detection unit 14. The second detection unit 14 detects the falling of the delayed IG signal 52 at the time point t13 after time Δtb elapses from the time point t11. The second detection unit 14 outputs the detection signal 52L, which indicates that the falling of the delayed IG signal 52 is detected, to the power saving shift unit 151 and the return unit 152.

The power saving shift unit 151 receives the detection signal 52L, which indicates the falling of the delayed IG signal 52, from the second detection unit 14 at the time point t13. The time difference between the time point t12 and the time point t13 corresponds to the delay time difference Δtc. Therefore, the power saving shift unit 151 determines that the falling indicated by the detection signal 52L received at the time point t13 has the same level change as the falling indicated by the detection signal 51L received at the time point t12. The arbitration processing is started based on the detection signal 51L received at the time point t12, so that the power saving shift unit 151 ignores the detection signal 52L received at the time point t13. That is, the arbitration processing is not started with trigger of detection signal 52L received at the time point t13.

In this way, when the information processing apparatus 1 receives the detection signal 51L during the operation in the normal mode, the information processing apparatus 1 starts the arbitration processing.

(Start of Preparation Processing)

When the information processing apparatus 1 having terminated the arbitration processing receives two detection signals indicating the same level change, the power saving shift unit 151 starts the preparation processing. In the example shown in FIG. 4, two detection signals indicating the same level change are the detection signal 51L received at the time point t12 and the detection signal 52L received at the time point t13.

When the arbitration processing terminates at a time point after the time point t13, the power saving shift unit 151 instructs start of the preparation processing immediately after the arbitration processing terminates. For example, as shown in FIG. 4, when the arbitration processing terminates at the time point t14, the power saving shift unit 151 outputs the preparation instruction signal K2 to the normal control unit 16 at the time point t14.

It is assumed that the arbitration processing terminates at a time point before the time point t13 shown in FIG. 4. The power saving shift unit 151 does not receive two detection signals indicating the same level change at the termination time point of the arbitration processing. In this case, the power saving shift unit 151 waits until the time point t13 when the detection signal 52L indicating the falling of the delayed IG signal 52 is received. The power saving shift unit 151 instructs the start of the preparation processing at the time point t13 when the detection signal 52L indicating the falling is received.

In this way, when the falling of the delayed IG signal 51 indicated by the detection signal 51L and the falling of the delayed IG signal 52 indicated by the detection signal 52L show the same falling, the preparation processing is started. As a result, when the falling of the delayed IG signal 51 or the delayed IG signal 52 accidentally occurs due to the influence of noises or the like, the information processing apparatus 1 can prevent the erroneous shift to the power saving mode.

The return unit 152 ignores the detection signal 52L received at the time point t13. This is because the operation mode is not the power saving mode at the time point t13.

When receiving the detection signal 51L indicating the falling of the delayed IG signal 51 at the time point t12, the power saving shift unit 151 may determine whether the detection signal 52L indicating the falling is received at the time point t13. When the power saving shift unit 151 cannot receive the detection signal 52L at the time point t13, the power saving shift unit 151 may cause the information processing apparatus 1 to operate in the normal mode without shifting to the power saving mode. This is because these two detection signals 51L and 52L do not show the same level change when the detection signals 51L and 52L indicating the falling are not received at an interval which is the delay time difference Δtc. As a result, it is possible to prevent erroneous shift to the power saving mode based on the detection signal affected by noises or the like.

(Execution of Preparation Processing)

The normal control unit 16 starts the preparation processing from the time point t14 based on the preparation instruction signal K2 received from the power saving shift unit 151.

The normal control unit 16 terminates a program executed in the normal mode by executing the preparation processing. The power saving shift unit 151 prohibits an interruption based on the detection signal 51L or 52L from the time point t14 when the normal control unit 16 starts the preparation processing. When the power saving shift unit 151 generates an interruption based on the detection signal 51L or 52L, there is a possibility that the program being terminated abnormally terminates. In order to prevent the abnormally terminated program from malfunctioning at next startup, the power saving shift unit 151 prohibits an interruption based on the detection signals 51L and 52L during the execution of the preparation processing.

At a time point t15, the preparation processing is terminated. The normal control unit 16 outputs a preparation termination notification R2, which notifies the termination of the preparation processing, to the power saving shift unit 151. The power saving shift unit 151 instructs the switch control unit 153 to turn off the switch 17 based on the preparation termination notification R2 received from the normal control unit 16. The switch control unit 153 turns off the switch 17 in response to the instruction from the power saving shift unit 151. As a result, the power supply from the battery 7 to the normal control unit 16 is stopped, so that the information processing apparatus 1 shifts to the power saving mode at the time point t15.

In the power saving mode, the power supply to the mode control unit 15 is continued. In the mode control unit 15, the door lock control unit 154 can execute control related to locking and unlocking of the key of the vehicle V even in the power saving mode.

{2.3. Return to Normal Mode (Pattern 1)}

Next, an example of the operation of the information processing apparatus 1 when the information processing apparatus 1 returns from the power saving mode to the normal mode will be described with reference to FIG. 4.

The IG signal 50 rises at a time point t16. The first filter 11 delays the IG signal 50 by the time Δta, so that the first detection unit 13 detects the rising of the delayed IG signal 51 at a time point t17 later than the time point t16 by time Δta. At the time point t17, the first detection unit 13 outputs the detection signal 51L indicating the rising of the delayed IG signal 51 to the power saving shift unit 151 and the return unit 152.

The power saving shift unit 151 ignores the detection signal 51L received at the time point t17. This is because the information processing apparatus 1 operates in the power saving mode at the time point t17.

The return unit 152 determines to cause the information processing apparatus 1 to return to the normal mode based on the detection signal 51L received at the time point t17. The return unit 152 instructs the switch control unit 153 to turn on the switch 17. The switch control unit 153 turns on the switch 17 in response to an instruction from the return unit 152. As a result, the normal control unit 16 can receive power supply from the battery 7. The normal control unit 16 activates a program for the meter control.

The second filter 12 delays the IG signal 50 by the time Δtb, so that the second detection unit 14 detects the rising of the delayed IG signal 52 at a time point t18 later than the time point t16 by the time Δtb. At the time point t18, the second detection unit 14 outputs the detection signal 52L, which indicates the rising of the delayed IG signal 52, to the power saving shift unit 151 and the return unit 152.

The information processing apparatus 1 operates in the normal mode, so that the power saving shift unit 151 and the return unit 152 ignore the detection signal 52L received from the second detection unit 14 at the time point t18.

{2.4. Return to Normal Mode (Pattern 2)}

Figure 5:
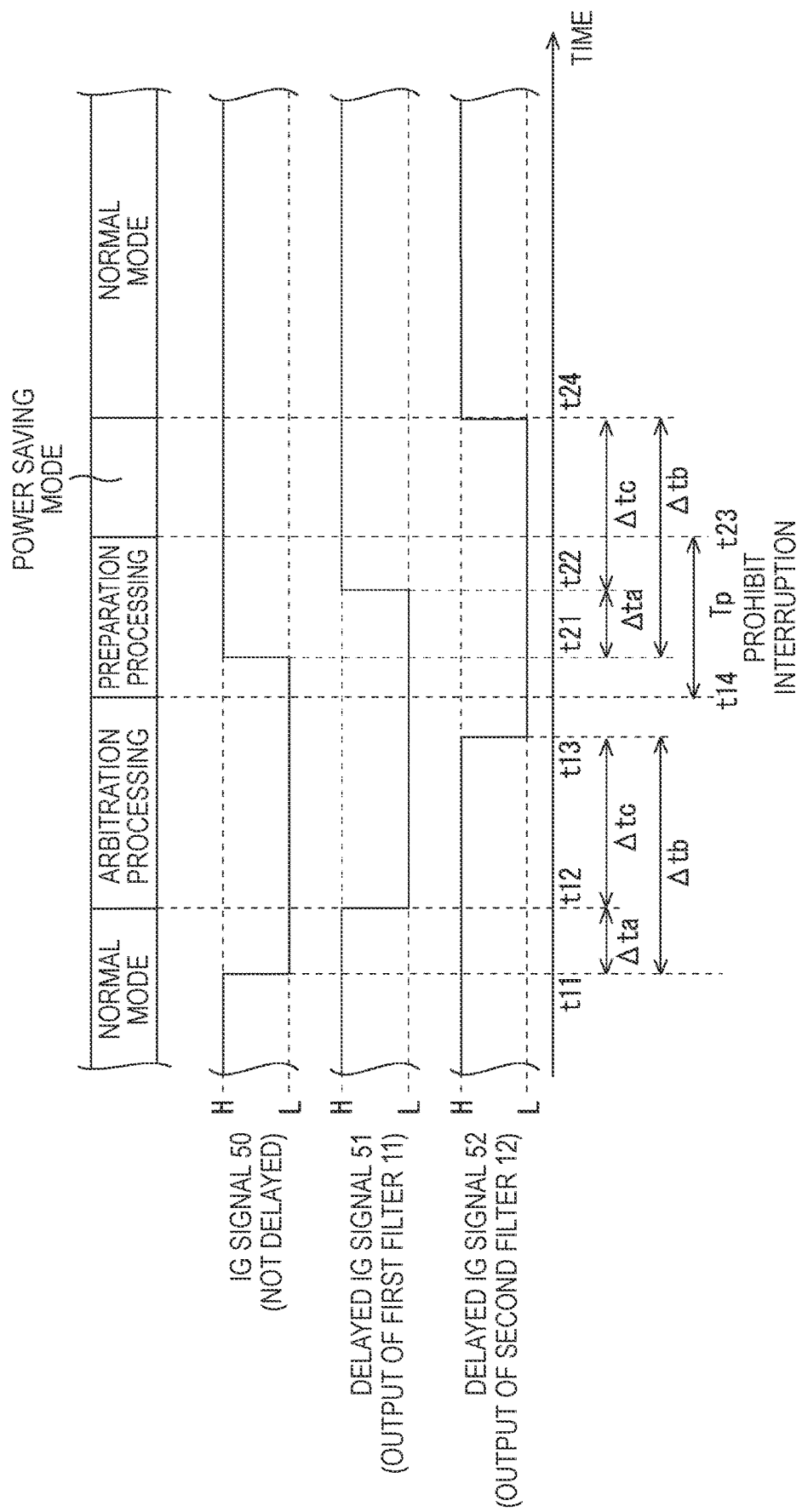
FIG. 5 is a time chart showing another example of operation when the information processing apparatus shown in FIG. 1 shifts to the power saving mode.

FIG. 5 is a time chart showing the operation of the information processing apparatus 1 when the delayed IG signal 51 rises during the execution of the preparation processing.

The operation of the information processing apparatus 1 during the period from the time point t11 to the time point t14 shown in FIG. 5 is the same as the operation of the information processing apparatus 1 during the period from the time point t11 to the time point t14 shown in FIG. 4.

The normal control unit 16 starts the preparation processing from the time point t14. At the time point t21, the signal level of the IG signal 50 rises. The first filter 11 delays the rising of the IG signal 50 at a time point t21 by time Δta. Therefore, the first detection unit 13 detects the rising of the delayed IG signal 51 at a time point t22 after the time Δta elapses from the time point t21. The first detection unit 13 outputs a detection signal 51L, which indicates the rising of the delayed IG signal 51, to the power saving shift unit 151 and the return unit 152 at the time point t22.

At the time point t22, the preparation processing is not terminated. As described above, the power saving shift unit 151 prohibits the interruption caused by the detection signals 51L and 52L during the execution of the preparation processing. Therefore, the power saving shift unit 151 cannot interrupt the preparation processing based on the detection signal 51L received at the time point t22. The interruption is prohibited, so that the return unit 152 ignores the detection signal 51L received at the time point t22.

The preparation processing is terminated at a time point t23 after the time point t22. At the time point t23, the power saving shift unit 151 releases the interruption prohibition and turns off the switch 17 via the switch control unit 153. The information processing apparatus 1 shifts to the power saving mode from the time point t23.

The second filter 12 delays the rising of the IG signal 50 at the time point t21 by time Δtb. Therefore, the second detection unit 14 detects the rising of the delayed IG signal 52 at a time point t24 after the time Δtb elapses from the time point t21. At the time point t24, the second detection unit 14 outputs the detection signal 52L, which indicates the rising of the delayed IG signal 52, to the power saving shift unit 151 and the return unit 152.

The power saving shift unit 151 ignores the detection signal 52L received from the second detection unit 14 at the time point t24. This is because the operation mode at the time point t24 is the power saving mode.

The return unit 152 receives the detection signal 52L indicating the rising of the delayed IG signal 52 from the second filter 14 at the time point t24. The operation mode at the time point t24 is the power saving mode, so that the return unit 152 determines to cause the information processing apparatus 1 to return to the normal mode based on the detection signal 52L received at the time point t24. The processing of returning information processing apparatus 1 to the normal mode at the time point t24 is the same as the processing at the time point t17 shown in FIG. 4, so that the description thereof is omitted.

In this way, when the rising of the delayed IG signal 51 is detected during the execution of the preparation processing, the power saving shift unit 151 and the return unit 152 receive the detection signal 51L indicating the rising of the delayed IG signal 51 during the execution of the preparation processing. However, the interruption based on the detection signal 51L or 52L is prohibited, so that the power saving shift unit 151 and the return unit 152 cannot interrupt the shift to the power saving mode.

The delay time difference Δtc is longer than the time tp required for the preparation processing, so that the rising of the delayed IG signal 52 output from the second filter 12 is detected after termination of the preparation processing. The return unit 152 can cause the information processing apparatus 1 to return to the normal mode based on the rising of the delayed IG signal 52 detected after the termination of the preparation processing.

Here, an information processing apparatus according to the related art without the second filter 12 is assumed. When the delayed IG signal 51 rises during the execution of the preparation processing, the information processing apparatus according to the related art cannot return to the normal mode based on the delayed IG signal 51 which rises during the execution of the preparation processing. In order to cause the information processing apparatus according to the related art return to the normal mode, the driver of the vehicle V must operate the vehicle V again such that the rising of the IG signal 50 occurs.

However, even if the rising of the delayed IG signal 51 occurs during the execution of the preparation processing, the information processing apparatus 1 can return to the normal mode based on the rising of the delayed IG signal 52. Even if the driver of the vehicle V does not operate the vehicle V to make the rising of the IG signal 50 occur, the information processing apparatus 1 can return to the normal mode rapidly.

{2.5. Return to Normal Mode (Pattern 3)}

Figure 6:
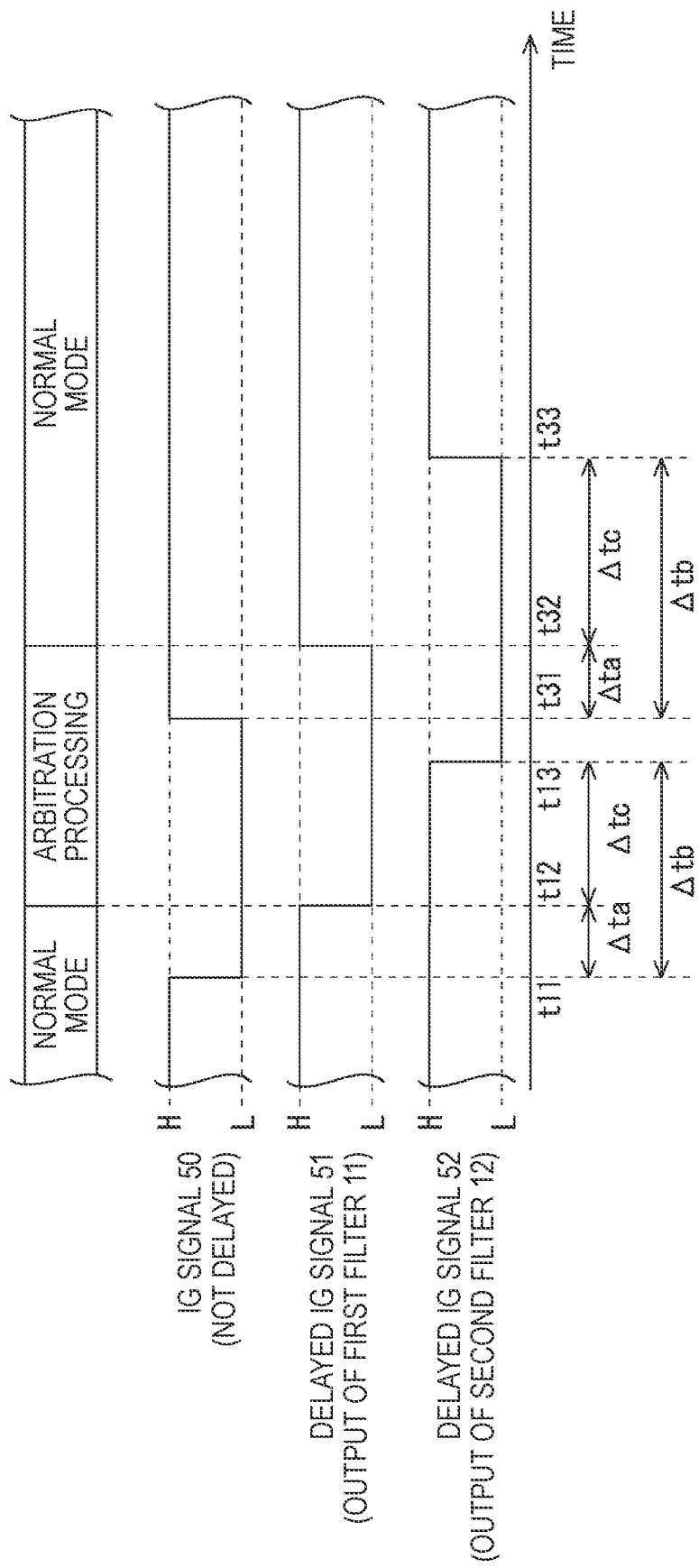
FIG. 6 is a time chart showing a further example of operation when the information processing apparatus shown in FIG. 1 shifts to the power saving mode.

FIG. 6 is a time chart showing the operation of the information processing apparatus 1 when the rising of the delayed IG signal 51 is detected during the execution of the arbitration processing.

The operation of the information processing apparatus 1 during the period from the time point t11 to the time point t13 shown in FIG. 6 is the same as the operation of the information processing apparatus 1 during the period from the time point t11 to the time point t13 shown in FIG. 4.

The IG signal 50 rises at a time point t31. The first filter 11 delays the rising of the IG signal 50 at the time point t31 by time Δta. The first detector 13 detects the rising of the delayed IG signal 51 at a time point t32 after time Δta elapses from the time point t11, and outputs the detection signal 51L indicating the rising of the delayed IG signal 51 to the power saving shift unit 151 and the return unit 152. It is assumed that the arbitration processing is not terminated at the time point t32.

At the time point t32, the operation mode is not the power saving mode. Therefore, the return unit 152 ignores the detection signal 51L received from the first detection unit 13 at the time point t32.

The power saving shift unit 151 determines the interruption of the arbitration processing based on the detection signal 51L received at the time point t32. The interruption based on the detection signal 51L or 52L is not prohibited during the arbitration processing, so that the power saving shift unit 151 can stop the arbitration processing. When the power saving shift unit 151 instructs the normal control unit 16 to stop the arbitration processing, the arbitration processing is stopped. In this way, when the rising of the delayed IG signal 51 is detected during the execution of the arbitration processing, the information processing apparatus 1 can continue the normal mode without shifting to the power saving mode.

The second filter 12 delays the rising of the IG signal 50 at the time point t31 by time Δtb. The second detection unit 14 detects the rising of the delayed IG signal 52 at a time point t33 after the delay time Δtb elapses from the time point t31. The power saving shift unit 151 and the return unit 152 receive the detection signal 52L indicating the rising of the delayed IG signal 52 from the second detection unit 14 at the time point t33. However, the operation mode at the time point t33 is the normal mode, so that the power saving shift unit 151 and the return unit 152 ignore the detection signal 52L received at the time point t33.

In this way, when the information processing apparatus 1 detects the rising of the delayed IG signal 51 during the execution of the arbitration processing, the information processing apparatus 1 stops the arbitration processing and maintains the normal mode. The information processing apparatus 1 can execute meter control executed in the normal mode without shifting to the power saving mode.

{2.6. Mode Shift Processing}

Figure 7:
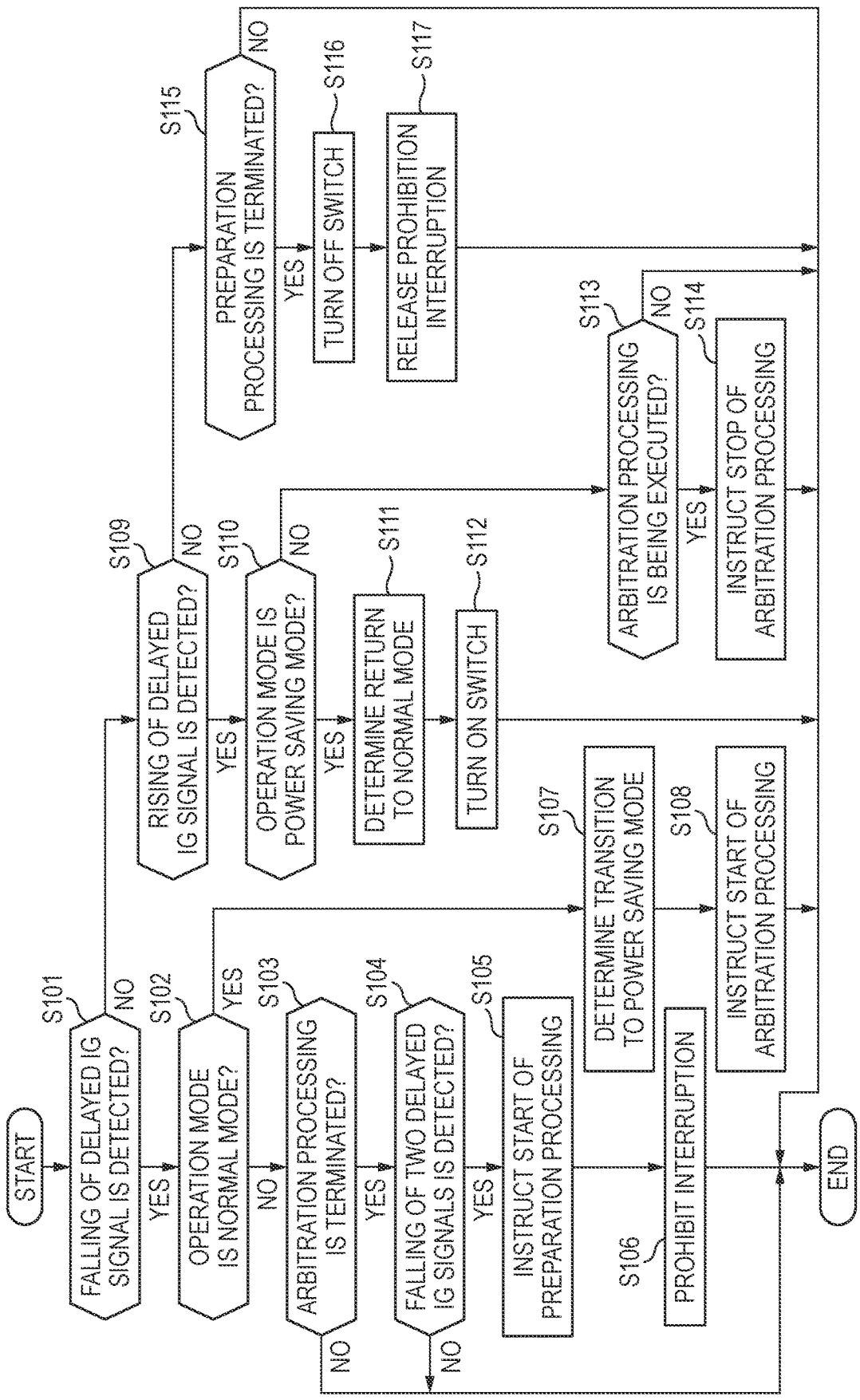
FIG. 7 is a flowchart of a mode shift processing executed by the information processing apparatus shown in FIG. 1.

FIG. 7 is a flowchart of a mode shift processing executed by the mode control unit 15 shown in FIG. 2. The mode control unit 15 repeatedly executes the mode shifting processing shown in FIG. 7 at predetermined intervals, thereby causing the information processing apparatus 1 to operate in either the normal mode or the power saving mode.

Referring to FIG. 7, the power saving shift unit 151 determines whether the falling of the delayed IG signal 51 is detected (step S101).

When the falling of the delayed IG signal 51 is not detected (No in step S101), the mode control unit 110 proceeds to step S109. Step S109 will be described below.

When the falling of the delayed IG signal 51 is detected (Yes in step S101), the power saving shift unit 151 confirms whether the operation mode of the information processing apparatus 1 is the normal mode (step S102).

When the operation mode is the normal mode (Yes in step S102), the power saving shift unit 151 determines to cause the information processing apparatus 1 to shift to the power saving mode (step S107). The power saving shift unit 151 instructs the normal control unit 16 to start the arbitration processing (step S108). Thereafter, the mode control unit 15 terminates the processing shown in FIG. 7. The processing of steps S107 and S108 corresponds to, for example, processing executed by the information processing apparatus 1 at the time point t14 shown in FIG. 4.

On the other hand, when the arbitration processing is being executed or when the preparation processing is being executed or when the operation mode is the power saving mode, the power saving shift unit 151 determines that the operation mode of the information processing apparatus 1 is not the normal mode (No in step S102). In this case, the power saving shift unit 151 determines whether the arbitration processing is terminated (step S103). The power saving shift unit 151 performs the determination of step S103 based on whether the arbitration termination notification R1 is received from the normal control unit 16.

When the arbitration processing is not terminated (No in step S103), the mode control unit 15 terminates the processing shown in FIG. 7. When the arbitration processing is terminated (Yes in step S103), the power saving shift unit 151 determines whether the falling of both of the delayed IG signals 51 and 52 is detected (step S104).

In step S104, the power saving shift unit 151 determines whether the falling of the delayed IG signal 52 is detected after the shift to the power saving mode is determined based on the falling of the delayed IG signal 51. When the falling of the delayed IG signal 52 is detected (Yes in step S104), the power saving shift unit 151 instructs the normal control unit 16 to start the preparation processing (step S105). The power saving shift unit 11 prohibits the interruption caused by the detection signal indicating the level change of the delayed IG signals 51 and 52 (step S106). Thereafter, the mode control unit 15 terminates the processing shown in FIG. 7.

When the falling of both of the delayed IG signals 51 and 52 is not detected (No in Step S105), the mode control unit 15 terminates the processing shown in FIG. 7.

In step S105, it may be determined whether the difference between the time when the falling of one of the delayed IG signals is detected and the time when the falling of the other one of the delayed IG signals is detected matches the delay time difference $\Delta tc$. When the falling of the two delayed IG signals is detected and the difference between the times when the falling of the two delayed IG signals is detected matches the delay time difference $\Delta tc$, the power saving shift unit 151 may execute step S106.

Step S110 will be described. When the falling of the delayed IG signal is not detected (No in step S101), the return unit 152 determines whether the rising of the delayed IG signal is detected (step S109).

When the rising of the delayed IG signal is not detected (No in step S109), the mode control unit 15 proceeds to step S115. Step S115 will be described below.

When the rising of the delayed IG signal is detected (Yes in step S109), the return unit 152 determines whether the operation mode of the information processing apparatus 1 is the power saving mode (step S110).

When the operation mode is the power saving mode (Yes in step S110), the return unit 152 determines to cause the operation mode of the information processing apparatus 1 to return to the normal mode (step S111). The return unit 152 instructs the switch control unit 153 to resume the power supply to the normal control unit 16. The switch control unit 153 turns on the switch 17 in response to the instruction from the return unit 152 (step S112). For example, steps S111 and S112 correspond to the processing at the time point t17 shown in FIG. 4. As a result, the information processing apparatus 1 returns from the power saving mode to the normal mode. The mode control unit 15 terminates the processing shown in FIG. 7.

When the operation mode is not the power saving mode (No in step S110), the power saving shift unit 151 determines whether the arbitration processing is being executed (step S113).

When the arbitration processing is not being executed (No in step S113), the mode control unit 15 terminates the processing shown in FIG. 7. When the arbitration processing is being executed (Yes in step S113), the power saving shift unit 151 instructs the normal control unit 16 to stop the arbitration processing (step S114). As a result of step S114, the information processing apparatus 1 continues the operation in the normal mode. The mode control unit 15 terminates the processing shown in FIG. 7.

Step S115 will be described. When the rising of the delayed IG signal is not detected (No in step S115), the power saving shift unit 151 determines whether the preparation processing is terminated (step S115).

When the power saving shift unit 151 receives the preparation termination notification R2 from the normal control unit 16, the power saving shift unit 151 determines that the preparation processing is terminated (Yes in step S115). In this case, the power saving shift unit 151 instructs the switch control unit 153 to stop the power supply. The switch control unit 153 turns off the switch 17 in response to an instruction from the power saving shift unit 151 (step S116). As a result, the power saving mode is started. The power saving shift unit 151 releases the interruption which is based on the detection signals 51L and 52L prohibited in step S107 (step S117). The mode control unit 15 terminates the processing shown in FIG. 7.

As described above, the information processing apparatus 1 includes the first filter 11 which delays the IG signal 50 by the delay time Δta, and the second filter 12 which delays the IG signal 50 by the delay time Δtb. The delay time difference Δtc, which is the difference between the delay time Δta and the delay time Δtb, is longer than the time required for the preparation processing for prohibiting the interruption which is based on the detection signals 51L and 52L. Therefore, even if the mode control unit 15 receives the detection signal 51L indicating the rising of the delayed IG signal 51 during the execution of the preparation processing, the mode control unit 15 can rapidly cause the information processing apparatus 1 to return to the normal mode based on the detection signal 52L indicating the rising of the delayed IG signal 52.

When the power saving shift unit 151 receives the detection signal 51L indicating the falling of the delayed IG signal 51 in the normal mode, the power saving shift unit 151 starts the arbitration processing regardless of whether the detection signal 52L indicating the falling of the delayed IG signal 52 is received. The arbitration processing can start before the detection signal 52L indicating the falling of the delayed IG signal 52 is received, so that the time from occurrence of the falling in the IG signal 50 to the shift to the power saving mode can be shortened, and the power consumption can be reduced.

When the arbitration processing is terminated, the power saving shift unit 151 confirms whether the two detection signals indicating the same falling are received. When the power saving shift unit 151 receives two detection signals indicating the same falling, the preparation processing is started. As a result, when the falling occurs in either of the delayed IG signals 51 and 52, the information processing apparatus 1 is prevented from erroneously shifting to the power saving mode.

The information processing apparatus 1 includes the first detection unit 13 which detects a level change in the delayed IG signal 51 and the second detection unit 14 which detects a level change in the delayed IG signal 52. The level change in each of the delayed IG signals 51 and 52 can be detected, so that it is possible to determine whether the level change in the delayed IG signal 51 and the level change in the delayed IG signal 52 occur in the delay time difference Δtc with high accuracy. When the falling occurs in the delayed IG signal accidentally, the preparation processing is prevented from starting. As a result, even though the driver of the vehicle V does not perform operation of making the IG signal low, it is possible to prevent the vehicle V from erroneously shifting to the power saving mode.

MODIFICATION EXAMPLE

In the above embodiment, an example in which the information processing apparatus 1 shifts to the power saving mode when the falling of the delayed IG signal is detected has been described, but the present invention is not limited to the example. The information processing apparatus 1 may shift to the power saving mode when the power saving shift unit 151 detects the rising of the delayed IG signal. In this case, the information processing apparatus 1 returns to the normal mode when the return unit detects the falling of the delayed IG signal. That is, when the power saving shift unit 151 detects a predetermined level change in the delayed IG signal, the information processing apparatus 1 may shift to the power saving mode.

An example in which the return unit 152 causes the information processing apparatus 1 to shift to the power saving mode when the rising of the delayed IG signal is detected has been described, but the present invention is not limited to the example. The return unit 152 may cause the information processing apparatus 1 to return to the normal mode when a predetermined level change different from the falling of the delayed IG signal 51 is detected.

In the above embodiment, an example in which the arbitration processing is started when the falling of the delayed IG signal 51 is detected has been described, but the present invention is not limited to the example. When the falling of the delayed IG signal 52 is detected, the information processing apparatus 1 may start the arbitration processing. In this case, the information processing apparatus 1 omits step S104 shown in FIG. 7. This is because the falling of both of the delayed IG signals 51 and 52 cannot be detected.

In the above embodiment, an example in which the power saving shift unit 151 starts the preparation processing when the detection signals 51L and 52L indicating the same falling are detected has been described, the present invention is not limited to the example. When the falling is detected from at least one of the detection signals 51L and 52L, the power saving shift unit 151 may start the preparation processing.

In the above embodiment, an example in which the information processing apparatus 1 includes the first detection unit 13 and the second detection unit 14 has been described, but the present invention is not limited to the example. The information processing apparatus 1 may include one detection unit which detects a level change in each of the delayed IG signals 51 and 52. That is, the configuration of the information processing apparatus 1 is not particularly limited as long as the level change in the delayed IG signals 51 and 52 can be detected.

Figure 8:
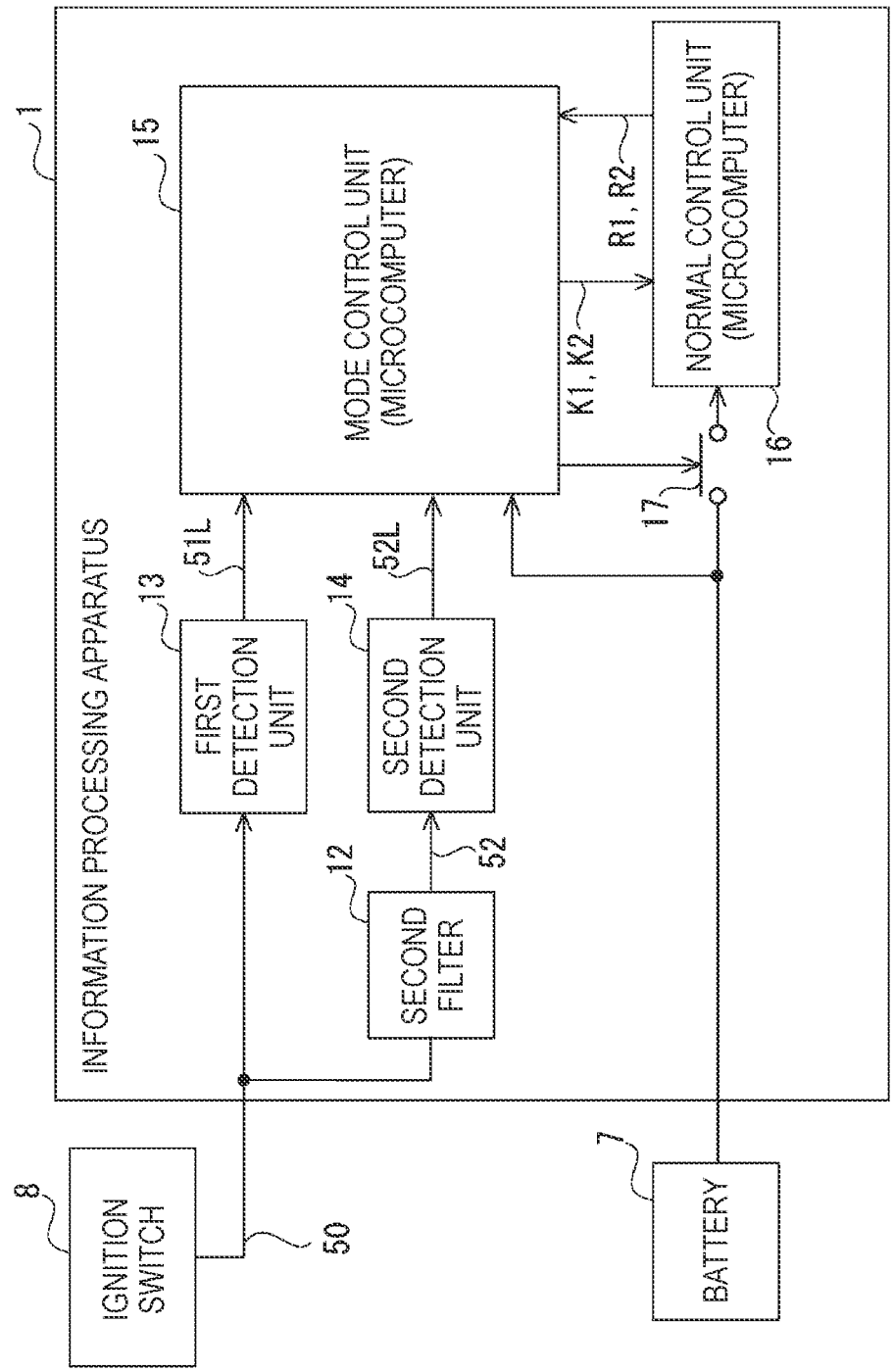
FIG. 8 is a function block diagram showing a modification example of the configuration of the information processing apparatus shown in FIG. 1.

In the above embodiment, an example in which the information processing apparatus 1 includes the first filter 11 has been described, but the present invention is not limited to the example. The information processing apparatus 1 may not include the first filter 11 as shown in FIG. 8. In this case, the delay time of the second filter 12 may be longer than the time required for the preparation processing. When the ignition signal 50 changes from "ON" to "OFF", the information processing apparatus 1 shifts from the normal mode to the power saving mode. When the ignition signal 50 changes from "OFF" to "ON", the information processing apparatus 1 may return from the power saving mode to the normal mode.

In the above embodiment, an example in which the information processing apparatus 1 is a body ECU has been described, but the present invention is not limited to the example. The information processing apparatus 1 may be an ECU other than the body ECU. Specifically, the information processing apparatus 1 may be any device which operates in either of the first mode and the second mode with power consumption lower than the first mode.

In the above embodiment, an example in which the information processing apparatus 1 includes one normal control unit 16 has been described, but the present invention is not limited to the example. The information processing apparatus 1 may include two or more normal control units 16. In this case, the information processing apparatus 1 may operate in a plurality of power saving modes having different power consumption. For example, when the information processing apparatus 1 operates in a first power saving mode, the mode control unit 15 causes all the normal control units 16 to stop. When the information processing apparatus 1 operates in a second power saving mode, one of the plurality of normal control units 16 is operated. In this way, the mode control unit 16 may change the number of the normal control units 16 to be stopped in accordance with each of the plurality of power saving modes.

Figure 9:
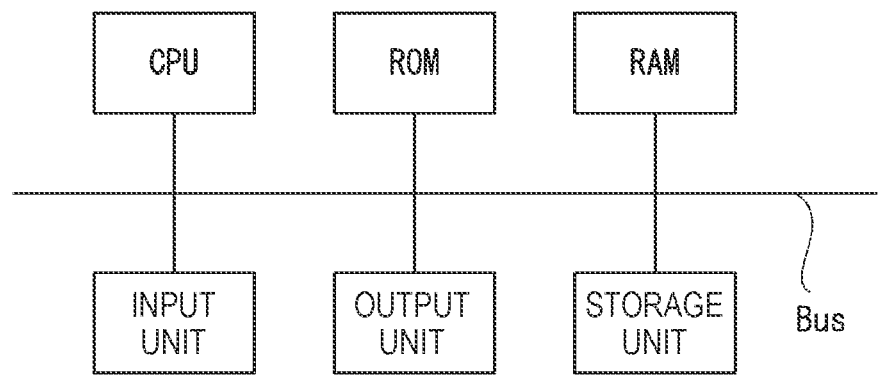
FIG. 9 is a figure showing a configuration of a CPU bus.

In the above embodiment, an example in which the mode control unit 15 and the normal control unit 16 are microcomputers has been described. For example, the mode control unit 15 and the normal control unit 16 have a hardware configuration shown in FIG. 9 (for example, a hardware configuration in which a CPU, a ROM, a RAM, an input unit, an output unit, and the like are connected by a bus). As a result, functional blocks of the mode control unit 15 may be realized by software.

The order of execution of the processing method in the above embodiment is not limited to the description of the above embodiment, and the order of execution may be changed without departing from the scope of the invention.

A computer program for causing a computer to execute the method described above and a computer-readable recording medium storing the program are contained in the scope of the present invention. Here, examples of the computer-readable recording medium include a flexible disk, a hard disk, a CD-ROM, a MO, a DVD, a DVD-ROM, a DVD-RAM, a large-capacity DVD, a next-generation DVD and a semiconductor memory.

Although the embodiment of the present invention has been described above, the embodiment described above is merely an example for implementing the present invention. Therefore, the present invention is not limited to the above-described embodiments, and can be implemented by appropriately modifying the above-described embodiment without departing from the scope of the invention.

What is claimed is:

1. An information processing apparatus, which operates in an operation mode as either one of a first mode and a second mode in which power consumption is lower than power consumption in the first mode, the information processing apparatus comprising:
    a delay filter configured to delay a mode signal indicating the operation mode by a delay time, the delay time being longer than a time required by a preparation processing;
    an additional filter configured to delay the mode signal by an additional delay time shorter than the delay time of the delay filter, and a difference between the additional delay time and the delay time is longer than the time required by the preparation processing, and
    one or more processors programmed to act as:
        a normal control unit configured to (i) execute a predetermined processing when the operation mode is the first mode, (ii) stop when the operation mode is the second mode, and (iii) execute the preparation processing in a case where the operation mode of the information processing apparatus is shifted to the second mode;
        a power saving shift unit configured to cause the normal control unit to execute the preparation processing in a case where the mode signal indicates shifting to the second mode, and to interrupt reception of a new mode signal and a new mode signal delayed by the delay filter while the normal control unit executes the preparation processing, the power saving shift unit being configured to stop the normal control unit after termination of the preparation processing; and
        a return unit configured to release the stop of the normal control unit in a case where, after the normal control unit terminates the preparation processing, at least one of the mode signal and the mode signal delayed by the delay filter indicates returning to the first mode, wherein:
    in a case where a mode signal delayed by the additional filter indicates the shifting to the second mode, the power saving shift unit:
        causes the normal control unit to execute the preparation processing,
        interrupts reception of a new mode signal delayed by the additional filter and a new mode signal delayed by the delay filter while the normal control unit executes the preparation processing, and
        stops the normal control unit after the termination of the preparation processing, and
    the return unit releases the stop of the normal control unit in a case where at least one of the mode signal delayed by the additional filter and the mode signal delayed by the delay filter indicates the returning to the first mode.

2. The information processing apparatus according to claim 1, wherein, in response to receiving the mode signal indicating the shifting to the second mode from the additional filter, the power saving shift unit starts arbitration processing to notify another apparatus of the shifting to the second mode before the preparation processing regardless of whether the mode signal indicating the shifting to the second mode is received from the delay filter.

3. The information processing apparatus according to claim 2, wherein the power saving shift unit causes the normal control unit to start the preparation processing in response to the mode signal indicating the shifting to the second mode from the delay filter when the arbitration processing is terminated.

4. The information processing apparatus according to claim 2, further comprising
    a first detection unit configured to detect the mode signal delayed by the additional filter; and
    a second detection unit configured to detect the mode signal delayed by the delay filter.

5. The information processing apparatus according to claim 3, further comprising
    a first detection unit configured to detect the mode signal delayed by the additional filter; and
    a second detection unit configured to detect the mode signal delayed by the delay filter.

6. A method of controlling an information processing apparatus including one or more processors programmed to act as a normal control unit that is configured to execute a predetermined processing when an operation mode is a first mode, and to stop when the operation mode is a second mode in which power consumption is lower than power consumption in the first mode, the method comprising:
    delaying, by a delay filer, a mode signal indicating the operation mode by a delay time, the delay time being longer than a time required for a preparation processing executed by the normal control unit in a case where the operation mode is shifted to the second mode;
    delaying, by an additional filter, the mode signal by an additional delay time shorter than the delay time, and a difference between the additional delay time and the delay time is longer than the time required by the preparation processing;
    causing the normal control unit to execute the preparation processing in a case where the mode signal indicates shifting to the second mode, interrupting reception of a new mode signal and a new mode signal delayed by the delay filter while the normal control unit executes the preparation processing, and stopping the normal control unit after termination of the preparation processing; and releasing stop of the normal control unit in a case where, after the normal control unit terminates the preparation processing, at least one of the mode signal and the mode signal delayed by the delay filter indicates returning to the first mode.

* * * * *